United States Patent Office 2,950,279
Patented Aug. 23, 1960

2,950,279

SUBSTITUTED BENZENESULFONYL-
HYDRAZONES (M)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,834

4 Claims. (Cl. 260—239.6)

The instant invention relates to novel organic compounds, and more particularly, to novel substituted benzenesulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wavelength produces undesirable reddening effect on the skin) and low absorption of light radiation in the neighborhood of 3400 A. (which wavelength produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes*, *Micrococcus pyogenes*, and *Escherichia coli* tend to become resistant to the known sulfa drugs, although they may be particularly sensitive to a new sulfa compound. It is believed that exposure of such bacteria to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzenesulfonylhydrozones.

It is another object of the instant invention to provide new and useful amino- and acetamido-substituted benzenesulfonylhydrazones of certain heterocyclic aldehydes and ketones.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the formula:

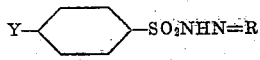

wherein Y is a monovalent radical selected from the group consisting of —NH$_2$ and —NHCOCH$_3$ and R is a divalent heterocyclic radical containing at least one five-to-six-membered heterocyclic ring containing at least one nuclear O and the remainder nuclear C's.

As indicated, the radical Y is a monovalent radical selected from the group consisting of —NH$_2$ and —NHCOCH$_3$; and these compounds are thus p-aminobenzenesulfonylhydrazones or p - acetamidobenzenesulfonylhydrazones of certain heterocyclic aldehydes and ketones.

In each case, these heterocyclic aldehydes or ketones contain only O and C nuclear atoms, with at least one such nuclear atom being an O and with no nuclear O bonded directly to another nuclear O. Thus five membered rings contain one O (as in the furan ring) or two O's (as in the dioxole ring) as follows:

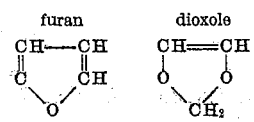

furan       dioxole

The six membered rings contain one to three O's, as follows:

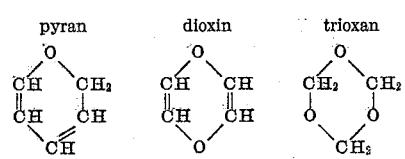

pyran     dioxin     trioxan

There may be from one to two C to C unsaturations in the heterocyclic ring, or the ring may be saturated.

The radical R may contain one or two aromatic groups such as phenyl groups; and these may be unconjugated or conjugated with the heterocyclic ring (as in piperonal). The nuclear C's in the heterocyclic or aromatic rings may have a total of as many as three aliphatic and one nitro substitutions. One aliphatic group is preferably a "linking" C$_1$—C$_6$ hydrocarbon group connecting the ring with the hydrazine N. The other aliphatic groups are preferably C$_1$—C$_4$ alkyl groups attached to nuclear C's. The radical R preferably contains from 3 to 18 C's and 1 to 3 O's. Preferably, R contains a total of 1 to 2 rings (conjugated or separate). Up to one additional carbonyl O may be present in R (as in alpha-acetyl-butyrolactone). The nitro substituent, if any, is on a nuclear C.

Typical compounds of the invention include the following:

p-aminobenzenesulfonylhydrazone of 5-nitro-furfural:

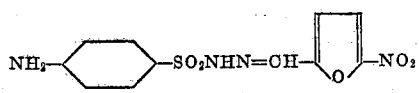

p-aminobenzenesulfonylhydrazone of piperonal:

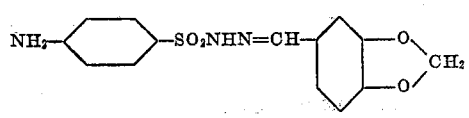

p-aminobenzenesulfonylhydrazone of dimethyl furfural:

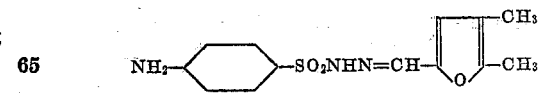

p-aminobenzenesulfonylhydrazone of furfuryl acetone:

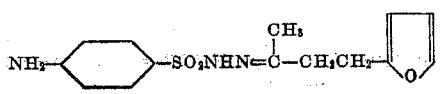

p-aminobenzenesulfonylhydrazone of desoxy-furfuroin:

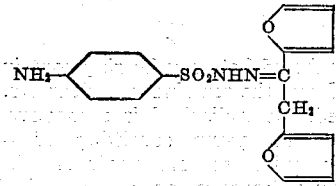

p-aminobenzenesulfonylhydrazone of phenyl furfuryl ketone:

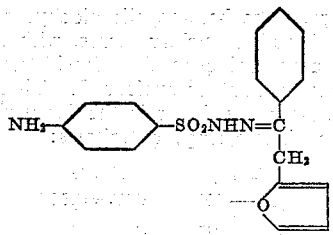

p-aminobenzenesulfonylhydrazone of furfuracrolein:

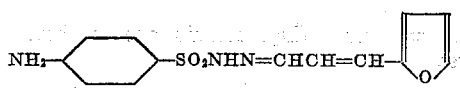

p-aminobenzenesulfonylhydrazone of 2-acetyl dioxolane:

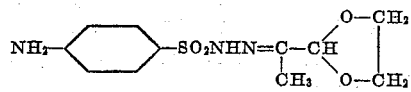

p-aminobenzenesulfonylhydrazone of 2-acetyl benzofuran:

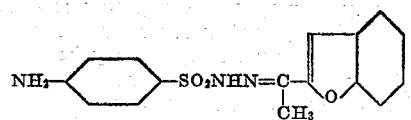

p-aminobenzenesulfonylhydrazone of pyrone:

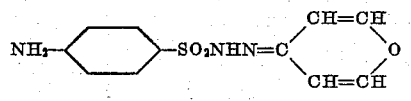

p-aminobenzenesulfonylhydrazone of acetyl dioxane:

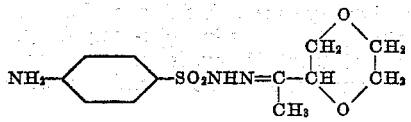

p-acetamidobenzenesulfonylhydrazone of furfural:

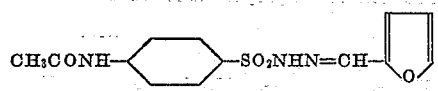

p-acetamidobenzenesulfonylhydrazone of piperonal:

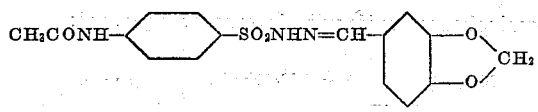

p-acetamidobenzenesulfonylhydrazone of alpha-acetyl-butyrolactone:

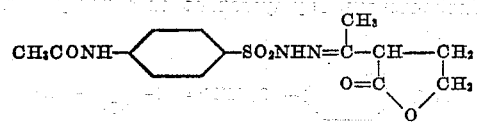

p-acetamidobenzenesulfonylhydrazone of furfuracrolein:

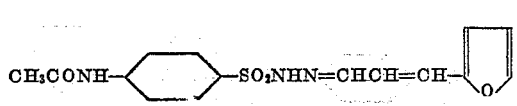

The compounds of the instant reaction are prepared by reacting the aldehyde or ketone with p-acetamidobenzenesulfonylhydrazine or p-aminobenzenesulfonylhydrazine. The reaction is carried out advantageously in a solvent; and the solvents preferably used are water, alcohol, dioxane, or mixtures of these. The p-acetamidobenzenesulfonylhydrazine or p-aminobenzenesulfonylhydrazine is relatively insoluble in the solvents; and the reaction is facilitated by application of external heat and stirring. The hydrazine reactant is first placed in the solvent and heat is applied; then substantially an equal molecular quantity of the aldehyde or ketone is added, preferably a small amount at a time with stirring, until the reaction is completed, as evidenced by a homogeneous appearance of the reaction mixture. The entire reaction may take only 5 to 10 minutes ordinarily. The product separates from the reaction mixture on cooling to room temperature and the product may be re-crystallized from alcohol, water, dioxane or a mixture thereof, to yield a relatively pure product.

*Example 1* p-Aminobenzenesulfonylhydrazine (0.040 mol) is dissolved in a mixture of 50 ml. of methanol and 50 ml. of water. Furfural (0.040 mol) is added to the solution, with vigorous stirring, and the reaction mixture is permitted to cool to room temperature, and the crystals which have precipitated out are collected in a suction filter and dried in an oven at 95° C. The product is re-crystallized from a mixture of hot methanol and water to yield a substantially pure product in the form of tan crystals which melt with decomposition at 142–142.5° C. Analysis for p-aminobenzenesulfonylhydrazone of furfural: calculated for $C_{11}H_{10}N_3O_3S$ is C=49.80, H=4.18, N=15.84; and found: C=49.91, H=4.29, N=15.82.

*Example 2*

A procedure is carried out that is the same as that of Example 1, except that piperonal is used in place of the furfural, and the result is a white crystalline product having a melting point of 174–175° C. Analysis for p-aminobenzenesulfonylhydrazone of piperonal: calculated for $C_{15}H_{15}N_3O_3S$ is C=52.66, H=4.10, N=13.16; and found: C=52.69, H=4.23, N=12.96.

The other p-aminobenzenesulfonylhydrazones of aldehydes and ketones described herein are prepared by carrying out the same reaction procedure, substituting the selected aldhehyde or ketone for piperonal in the procedure just described.

*Example 3* p-Acetamidobenbenesulfonylhydrazone (0.04 mol) is dissolved in a mixture of 50 ml. of methanol and 50 ml. of water. Furfural (0.04 mol) is added to the solution, with vigorous stirring, and such stirring is continued as the solution cools to room temperature. During this cooling period, crystals begin separating from the reaction mixture. After two hours, the crystals are collected in a suction filter and dried in an oven at 95° C. The product is re-crystallized from a mixture of three parts of methanol and two parts of water, to yield a substantially pure product in the form of yellow crystals melting with decomposition at 186–187° C. Analysis for p-acetamidobenzenesulfonylhydrazone of 2-furfural: calculated for $C_{13}H_{13}N_3O_4S$ is C=50.80, H=4.26; and found: C=50.95, H=4.24.

*Example 4*

A procedure is carried out that is the same as that described in Example 3, except that piperonal is used in place of the furfural and the resulting product is a yellow crystalline material melting with decomposition at 203–204° C. Analysis for p-acetamidobenzene sulfonylhydrazone of piperonal: calculated for $C_{16}H_{15}N_3O_5S$ is C=53.17, H=4.75, N=11.63; and found C=52.94, H=4.36, N=11.56.

Example 5

A procedure is carried out that is the same as that described in Example 3, except that the furfural is replaced by alpha-acetylbutyrolactone and the result is a white crystalline product melting at 168.5–170° C. Analysis for p-acetamidobenzenesulfonylhydrazone of alpha-acetylbutyrolactone: calculated for $C_{14}H_{17}N_3O_5S$ is C=49.54, H=5.05, N=12.39; and found: C=49.55, H=5.14, N=12.14

Example 6

A procedure is carried out that is the same as that described in Example 3 except that the furfural is replaced by 5-nitrofurfural and the resulting product is an orange crystalline material melting at 167° C., the corresponding nitrofurfural derivative of p-aminobenzenesulfonylhydrazone is prepared using the procedure of Example 1.

The p-acetamidobenzenesulfonylhydrazones of the other aldehydes and ketones mentioned herein are prepared by carrying out the procedure of Example 3 using the selected aldehyde or ketone in place of furfural.

The compounds of the invention just described show peak absorptions of light radiation in the neighborhood of 2970 A. and low absorption of light radiation in the neighborhood of 3400 A., so that they may be used in sun tan lotions. The compounds also undergo decomposition upon melting; and, with respect to anti-bacterial activity, p-aminobenzenesulfonylhydrazone of furfural is exceptionally effective against *Escherichia coli* and p-aminobenzenesulfonylhydrazone of piperonal is effective against *Streptococcus pyogenes*.

It will be understood that modifications and variations may be effected without departing from the spirit and scope of the novel concepts of the present invention.

I claim as my invention:

1. A compound having the formula:

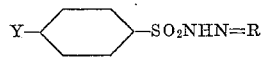

wherein Y is a monovalent radical selected from the group consisting of —$NH_2$ and —$NHCOCH_3$ and R is a divalent heterocyclic radical consisting of (a) one to two five-to-six membered heterocyclic rings containing only O and C nuclear atoms and at least one nuclear O and the remainder nuclear C's, and (b) not more than one conjugated phenyl ring, said radical R having (c) one aliphatic $C_1$—$C_6$ hydrocarbon group connecting a ring with the hydrazine N, (d) not more than two $C_1$—$C_4$ alkyl groups attached to nuclear carbon atoms, and (e) not more than one nitro group attached to a nuclear carbon atom, said radical R containing from 3 to 18 carbon atoms and from 1 to 3 oxygen atoms.

2. p-Aminobenzenesulfonylhydrazone of furfural.
3. p-Aminobenzenesulfonylhydrazone of piperonal.
4. p-Acetamidobenzenesulfonylhydrazone of alpha-acetylbutyrolactone.

References Cited in the file of this patent

UNITED STATES PATENTS 2,171,159    McNally et al. _____ Aug. 29, 1939

OTHER REFERENCES

Richter: The Chemistry of the Carbon Compounds, vol. IV, Elsevier, N.Y., pp. 14–15 (1947).